(12) United States Patent
Hsieh et al.

(10) Patent No.: US 7,448,278 B2
(45) Date of Patent: Nov. 11, 2008

(54) SEMICONDUCTOR PIEZORESISTIVE SENSOR AND OPERATION METHOD THEREOF

(75) Inventors: Hsieh-Shen Hsieh, Taoyuan Hsien (TW); Heng-Chung Chang, Taoyuan Hsien (TW); Cheng-Chang Lee, Taoyuan Hsien (TW); Chao-Jui Liang, Taoyuan Hsien (TW); Huang-Kun Chen, Taoyuan Hsien (TW); Tai-Kang Shing, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 3 days.

(21) Appl. No.: 11/643,661

(22) Filed: Dec. 22, 2006

(65) Prior Publication Data

US 2007/0148788 A1    Jun. 28, 2007

(30) Foreign Application Priority Data

Dec. 23, 2005   (TW) .............................. 94145987 A

(51) Int. Cl.
*G01L 9/00*    (2006.01)

(52) U.S. Cl. ............................. 73/754; 73/715; 73/721; 438/53

(58) Field of Classification Search ........... 73/700–756; 438/53
See application file for complete search history.

(56) References Cited

U.S. PATENT DOCUMENTS

| 4,802,952 A * | 2/1989 | Kobori et al. ................. 438/51 |
| 4,986,127 A * | 1/1991 | Shimada et al. ............... 73/714 |
| 5,231,301 A   | 7/1993 | Peterson et al. |
| 5,395,802 A * | 3/1995 | Kiyota et al. ................. 438/52 |
| 6,383,823 B1* | 5/2002 | Takahashi et al. ............. 438/14 |
| 6,649,989 B2* | 11/2003 | Benzel et al. ................ 257/419 |
| 7,284,443 B2* | 10/2007 | Sato et al. ..................... 73/754 |

* cited by examiner

*Primary Examiner*—Andre J. Allen
*Assistant Examiner*—Jermaine Jenkins
(74) *Attorney, Agent, or Firm*—Birch, Stewart, Kolasch & Birch, LLP

(57) ABSTRACT

A semiconductor piezoresistive sensor, which is electrically connected with a circuit, includes a semiconductor base, at least one piezoresistive element and a conductive layer. The semiconductor base includes a diaphragm and a base. The base is disposed adjacent to and around the diaphragm. The piezoresistive element is formed in the diaphragm and is electrically connected with the circuit. The conductive layer is electrically connected with the diaphragm.

17 Claims, 6 Drawing Sheets

SEMICONDUCTOR PIEZORESISTIVE SENSOR AND OPERATION METHOD THEREOF

This Non-Provisional application claims priority under U.S.C. § 119(a) on patent application Ser. No(S). 094145987, filed in Taiwan, Republic of China on Dec. 23, 2005, the entire contents of which are hereby incorporated by reference

BACKGROUND OF THE INVENTION

1. Field of Invention

The invention relates to a semiconductor sensor and in particular to a semiconductor piezoresistive sensor and an operation method thereof.

2. Related Art

Pressure sensors have been widely used in various fields. According to different application fields and requirements, the principles of the pressure measurements include a piezoresistive type, a piezoelectric type and a capacitive type. Because the piezoresistive sensor has advantages such as high output voltage and high sensitivity, the measurement can be performed by utilizing the effect that the resistance of the material changes according to different stress.

FIG. 1A is a schematic cross-sectional view showing a conventional semiconductor piezoresistive sensor 1. Referring to FIG. 1A, the semiconductor piezoresistive sensor 1 includes a semiconductor base 10, a piezoresistive element 11 and a circuit 12. The semiconductor base 10, such as a monocrystalline silicon base, includes a diaphragm 101 and a base 102. The base 102 fixes both ends of the diaphragm 101, and the piezoresistive element 11 is disposed within the diaphragm 101 for serving as the sensing device of the semiconductor piezoresistive sensor 1. The circuit 12 is electrically connected with the piezoresistive element 11 and the circuit 12 includes, for example, a complementary metal oxide semiconductor (CMOS), a bridge circuit, an amplifier circuit or a logic circuit for receiving and processing the signal output from the piezoresistive element 11.

The semiconductor base 10 is an n-minus($n^-$)-type semiconductor, which is transferred into a p-minus($p^-$)-type piezoresistive element 11 by way of diffusion or ion implantation. Herein, a p-n junction is formed between the semiconductor base 10 and the piezoresistive element 11. As shown in FIG. 1A, both ends of the piezoresistive element 11 are electrically connected with a p-plus($p^+$)-type interconnect element 13, respectively. The circuit 12 is electrically connected to the $p^+$-type interconnect element 13 through an opening 141 formed on an insulating layer 14, which covers the surface of the semiconductor base 10.

When a voltage V is inputted to the semiconductor piezoresistive sensor 1, a negative space charge is formed below the p-type piezoresistive element 11, and the negative space charge drifts with time so as to cause the resistance of the piezoresistive element 11 to change with time such that the output signal of the piezoresistive element 11 drifts with time. In addition, the insulating layer 14 binds some positive surface charges due to the material characteristic of the insulating layer 14, which also causes the positive surface charges to drift with time, the phenomenon relating to the resistance of the piezoresistive element 11 that varies with time becomes more serious. Accordingly, the precision of the output signal of the piezoresistive element 11 is deteriorated.

To solve the above-mentioned problem, another prior art discloses that an n-plus($n^+$)-doped region 15 is formed within the semiconductor base 10, as shown in FIG. 1B. Then, a proper voltage is inputted to the $n^+$-doped region 15 to form a reverse bias at the p-n junction so as to limit the current in the piezoresistive element 11. Thus, the phenomenon of the reduced precision of measurement of the semiconductor piezoresistive sensor 1 due to the leakage current can be improved. However, in the process of manufacturing the conventional $p^-$-type piezoresistive element 11, additional manufacturing processes, such as doping and thermal diffusion, and costs for masks which are necessary during the process of forming a $n^+$-doped region 15 within the $n^-$-type semiconductor base 10.

Therefore, it is an important subject of the invention to simplify the manufacturing process and effectively improve the phenomenon that the resistance of the piezoresistive element varies with time.

SUMMARY OF THE INVENTION

In view of the foregoing, the invention is to provide a semiconductor piezoresistive sensor, which is manufactured with simple processes so as to reduce the manufacturing cost and effectively enhance the precision of measurement, and an operation method thereof.

To achieve the above, a semiconductor piezoresistive sensor of the invention is electrically connected with a circuit. The semiconductor piezoresistive sensor includes a semiconductor base, at least one piezoresistive element and a conductive layer. The semiconductor base includes a diaphragm and a base disposed adjacent to and around the diaphragm. The piezoresistive element is formed in the diaphragm and is electrically connected with the circuit. The conductive layer is electrically connected with the diaphragm. Further, the semiconductor piezoresistive sensor includes an insulating layer and a shield layer, the insulating layer is disposed on the semiconductor base and covers the piezoresistive element, the shield layer is disposed on the insulating layer and covers at least a part of the insulating layer To achieve the above, the invention discloses an operation method of a semiconductor piezoresistive sensor. The operation method includes the steps of applying a first voltage to the circuit and applying a second voltage to the conductive layer. When a value obtained by subtracting the second voltage from the first voltage is less than a turn-on voltage between the piezoresistive element and the diaphragm, a junction between the piezoresistive element and the diaphragm forms a reverse bias or the junction is turned off.

To achieve the above, the invention also discloses a semiconductor piezoresistive sensor which is electrically connected with a circuit and includes a semiconductor base, at least one p-doped piezoresistive element, and a conductive layer. The semiconductor base has an n-doped base, and the at least one p-doped piezoresistive element is formed in the n-doped base. The conductive layer is electrically connected with the n-doped base so as to form a regional high doping concentration area, whereby surrounding the at least one p-doped piezoresistive element.

As mentioned above, the conductive layer or the shield layer is electrically connected with the diaphragm of the semiconductor base in the semiconductor piezoresistive sensor and the operation method thereof according to the invention. The conductive layer and the shield layer respectively include the conductive material and the non-insulating material. When the semiconductor piezoresistive sensor of the invention is applied to a circuit and a proper voltage is inputted into the conductive layer or shield layer, the junction between the piezoresistive element and the diaphragm is formed with a reverse bias or the junction is turned off such that the current is limited within the piezoresistive element.

Therefore, the phenomenon of the drift of the output signal of the piezoresistive element is improved. Compared to the prior art, it is unnecessary to form a semiconductor doping region, which is different from the piezoresistive element, on the semiconductor base in this invention. Thus, the manufacturing process is effectively simplified, the manufacturing cost is reduced, and the precision of measurement of the semiconductor piezoresistive sensor is enhanced.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

FIRST EMBODIMENT

Figure 1A:
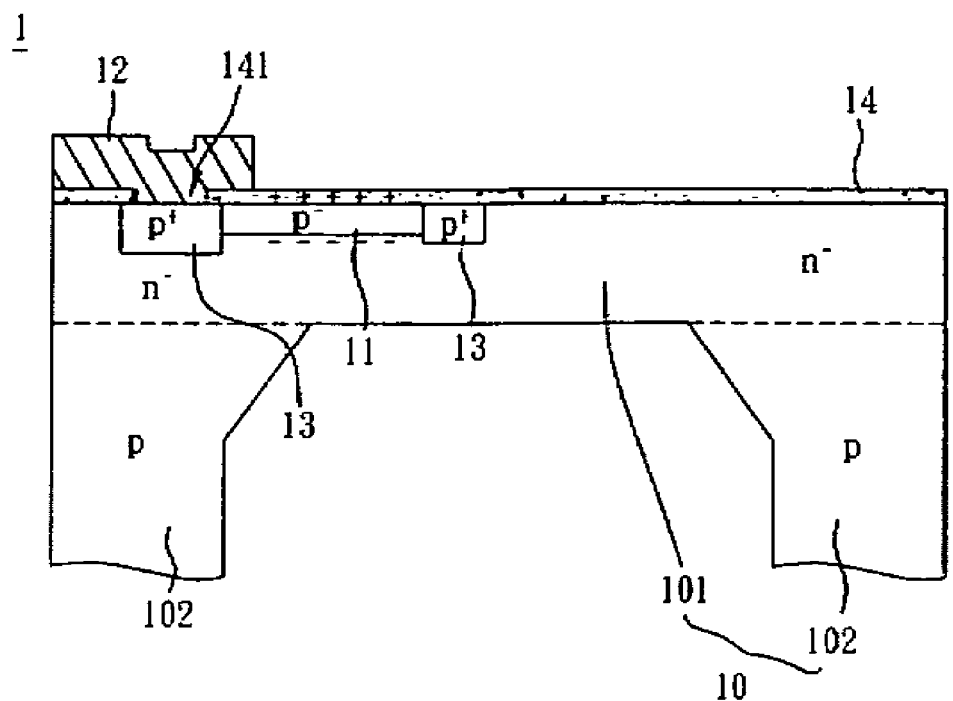
FIGS. 1A and 1B are schematic cross-sectional views showing the conventional semiconductor piezoresistive sensor.
Figure 1B:
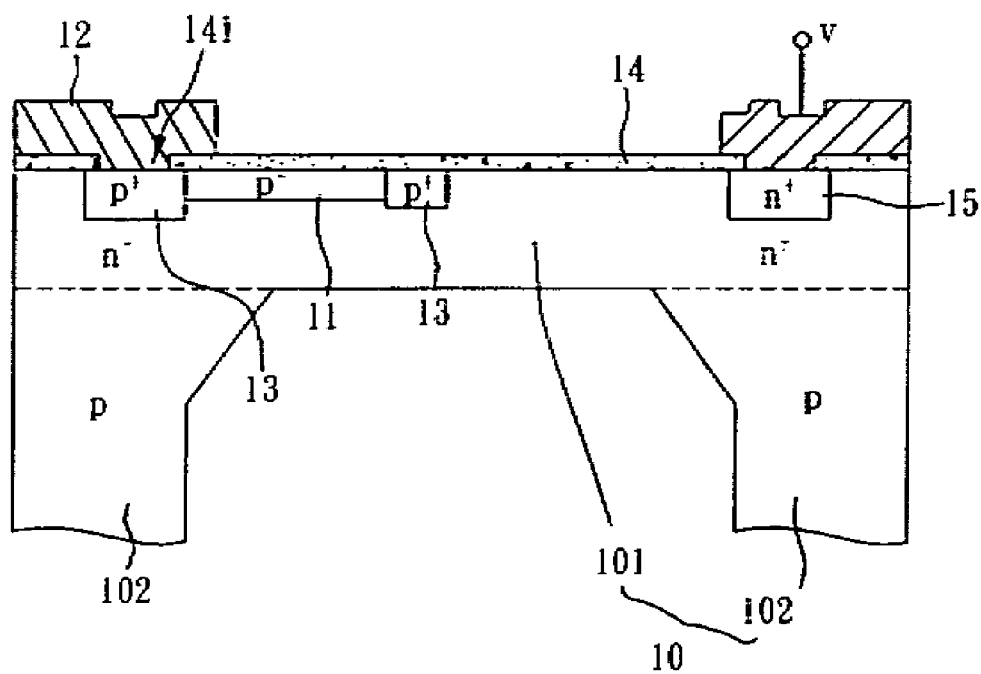
Figure 2A:
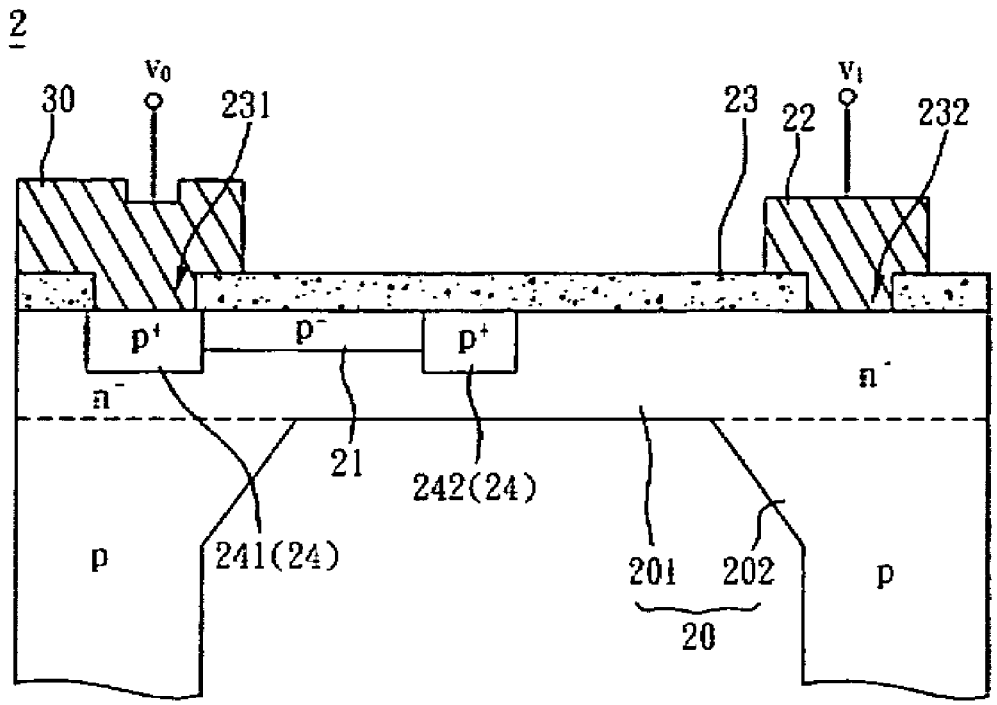
FIGS. 2A and 2B are schematic cross-sectional views showing a semiconductor piezoresistive sensor according to a first embodiment of the invention.
Figure 2B:
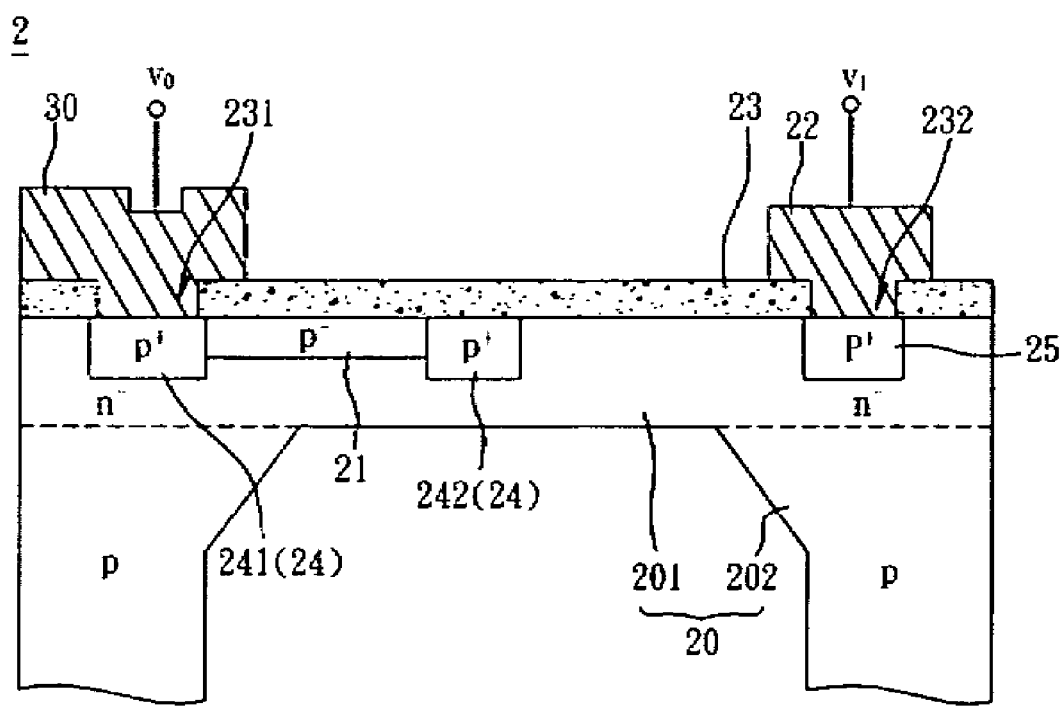

Referring to FIGS. 2A and 2B, a semiconductor piezoresistive sensor 2 according to the first embodiment of the invention includes a semiconductor base 20, an insulating layer 23, at least one piezoresistive element 21, at least one interconnect element 24 and a conductive layer 22. The semiconductor piezoresistive sensor 2 is electrically connected with a circuit 30, which is a bridge circuit or a temperature compensation circuit, for example.

The semiconductor base 20 includes a diaphragm 201 and a base 202 disposed adjacent to and around the diaphragm 201. In this embodiment, the diaphragm 201 is an n-doped region while the piezoresistive element 21 is a p-doped region. In more detailed, the structure of the semiconductor base 20 may be composed of an $n^-$-type epitaxial layer formed on a p-type wafer. The n-type dopant is, for example, phosphorus, arsenic and the likes, while the p-type dopant is, for example, boron, gallium, boron fluoride ($BF_2$), or the like.

The piezoresistive element 21 is formed in the diaphragm 201 and electrically connected with the circuit 30. In this embodiment, the piezoresistive element 21 is a $p^-$-type piezoresistive element 21 formed by using the process of diffusion or ion implantation to implant the p-type dopant into the diaphragm 201. A P-N junction is formed between the $p^-$-type piezoresistive element 21 and the n-doped region of the diaphragm 201. Thus, when a to-be-tested pressure is applied to the diaphragm 201, the diaphragm 201 deforms such that the resistance of the piezoresistive element 21 correspondingly changes. Then, the circuit 30 electrically connected with the piezoresistive element 21 is used to perform the signal processing, such as signal amplifying and temperature compensating, on the variation of the resistance. Alternatively, the received variation of the resistance is converted into a corresponding pressure, which is displayed on an external screen.

The insulating layer 23 is disposed on the semiconductor base 20 and covers the piezoresistive element 21. The material of the insulating layer 23 is such as silicon oxide, silicon nitride, silicon oxynitride or their combinations.

Further, the semiconductor piezoresistive sensor 2 of this embodiment includes at least one interconnect element 24. As shown in FIGS. 2A and 2B, the semiconductor piezoresistive sensor 2 may include, for example, a first interconnect element 241 and a second interconnect element 242, which are respectively electrically connected with both ends of the piezoresistive element 21. The piezoresistive element 21 is electrically connected to the circuit 30 via the first interconnect element 241. For example, the first interconnect element 241 may be electrically connected with other elements (not shown) in the bridge circuit. The insulating layer 23 is formed with an opening 231 such that the circuit 30 is electrically connected with the first interconnect element 241. In this embodiment, the interconnect element 24 may be a $p^+$-type semiconductor layer, for example.

As shown in FIG. 2A, the conductive layer 22 is disposed on the insulating layer 23, and the conductive layer 22 directly contacts and is thus electrically connected with the diaphragm 201 through another opening 232 of the insulating layer 23. The diaphragm 201 has the same doping concentration (N-) as the base. The conductive layer 22 may contact the diaphragm 201 in the manner of an ohmic contact or a Schottky contact.

Alternatively, as shown in FIG. 2B, the region for contacting the conductive layer 22 is the high-doping concentration region ($p^+$) 25. The p-doped region 25 between the conductive layer 22 and the diaphragm 201 is formed in the diaphragm 201 relative to the conductive layer 22 and forms the ohmic contact or Schottky contact with the conductive layer 22 through the opening 232 of the insulating layer 23. The p-doped region 25 uses the p-type dopant with the high doping concentration, and is thus called as the $p^+$-doped region. It is to be noted that the $p^+$-doped region 25 does not have to be formed by using additional processes, but can be formed with the processes of forming the interconnect element 24.

In either the semiconductor piezoresistive sensor 2 of FIG. 2A or that of FIG. 2B, a voltage V1+ may be properly applied to control the potential of the diaphragm (N-) 201 such that the potential of the diaphragm (N-) 201 does not drift. The voltage V1+ may be the bridge circuit voltage (e.g., VB+) of the piezoresistive element 21 or the voltage (e.g., the Vs+ coming from the temperature compensation circuit) greater than other bridge circuit voltages of the sensor. Thus, the junction between the piezoresistive element 21 and the diaphragm 201 is formed with a reverse bias or the P-N junction is turned off (the voltage across the PN junction is less than the turn-on voltage), and the current may be limited inside the resistor element and the potential of the diaphragm 201 may be controlled. Furthermore, it is possible to achieve the object of improving the drift of the output signal of the piezoresistive sensor 2 according to the structure layout and arrangement.

The operation method according to the first embodiment of the invention, which is applied to the semiconductor piezoresistive sensor 2 of FIGS. 2A and 2B, includes the steps of applying a voltage V1 to the conductive layer 22 and applying a voltage V0 to the circuit 30. When a value obtained by subtracting the voltage V1 from the voltage V0 is less than a turn-on voltage between the piezoresistive element 21 and the diaphragm 201, a junction between the piezoresistive element 21 and the diaphragm 201 is formed with a reverse bias or the P-N junction is turned off. Thus, the current is limited inside the piezoresistive element 21, and the object of improving the drift of the output signal of the piezoresistive sensor 2 can be achieved. The voltage V0 or voltage V1 may be the voltage of the bridge circuit or the temperature compensation circuit connected to the semiconductor piezoresistive sensor 2, or the voltage greater than that of the bridge circuit or the temperature compensation circuit.

SECOND EMBODIMENT

Figure 3A:
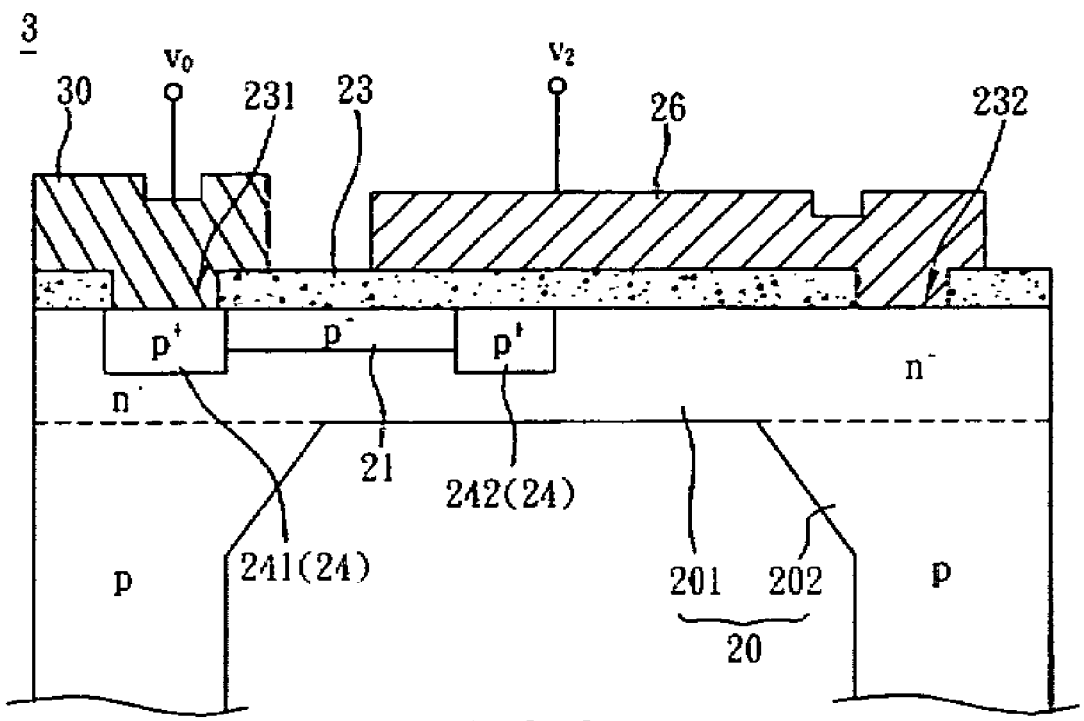
FIGS. 3A and 3B are schematic cross-sectional views showing a semiconductor piezoresistive sensor according to a second embodiment of the invention.
Figure 3B:
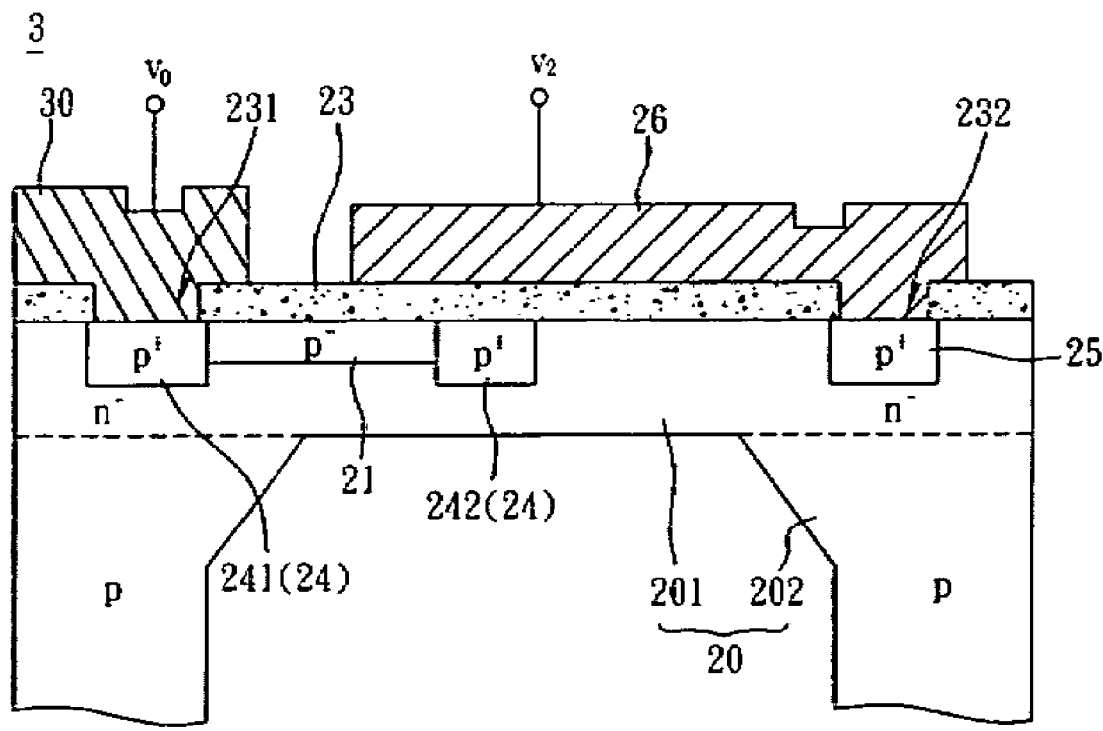

Referring to FIGS. 3A and 3B, a semiconductor piezoresistive sensor 3 according to the second embodiment of the invention includes a semiconductor base 20, an insulating layer 23, at least one piezoresistive element 21, at least one interconnect element 24 and a shield layer 26. The semiconductor piezoresistive sensor 3 is electrically connected with a circuit 30, which may be a bridge circuit or a temperature compensation circuit, for example. In this embodiment, the structures, features, materials, layouts, connections, and functions of the semiconductor base 20, the piezoresistive element 21, the interconnect element 24, the insulating layer 23 and the circuit 30 are the same as those of the first embodiment, so the detailed descriptions thereof will be omitted for concise purpose.

The difference between the second embodiment and the first embodiment is that the shield layer 26 of the second embodiment is disposed on the insulating layer 23. The semiconductor piezoresistive sensor 3 of this embodiment does not include the conductive layer 22, and the second embodiment includes the shield layer 26 that is not included in the first embodiment. The shield layer 26 is disposed on the insulating layer 23 and is electrically connected with the diaphragm 201. Also, the shield layer 26 covers at least a part of the insulating layer 23. In more detailed, the insulating layer 23 is formed with an opening 232, and the shield layer 26 directly connects and is thus electrically connected with the diaphragm 201 through the opening 232. The diaphragm 201 has the same doping concentration (N-) as the base, as shown in FIG. 3A. The shield layer 26 may contact the diaphragm 201 in the manner of an ohmic contact or a Schottky contact. The shield layer 26 is made of a non-insulating material having a TCE (Thermal Coefficient of Expansion), which preferably ranges from −15 ppm/° C. to +15 ppm/° C.

Alternatively, as shown in FIG. 3B, the region for contacting the shield layer 26 is the high-doping concentration region ($p^+$) 25. The p-doped region 25 between the conductive layer 22 and the diaphragm 201 is formed in the diaphragm 201 relative to the shield layer 26 and forms the ohmic contact or Schottky contact with the shield layer 26 through the opening 232 of the insulating layer 23. The p-doped region 25 uses the p-type dopant with the high doping concentration, and is thus called as the $p^+$-doped region. It is to be noted that the $p^+$-doped region 25 does not have to be formed by using additional processes, but can be formed with the processes of forming the interconnect element 24.

In either the semiconductor piezoresistive sensor 3 of FIG. 3A or that of FIG. 3B, a voltage V2+ may be properly applied to control the potential of the diaphragm (N-) 201 such that the potential of the diaphragm (N-) 201 does not drift. In addition, the surface potential on the piezoresistive element 21 is stabilized and the surface potential does not drift because of the shield layer 26, which properly shields the piezoresistive element 21 below the insulating layer 23, and the application of the voltage V2+. The voltage V2+ may be the bridge circuit voltage (e.g., VB+) of the piezoresistive element 21 or the voltage (e.g., the Vs+ coming from the temperature compensation circuit) greater than other bridge circuit voltages of the sensor. Thus, the junction between the piezoresistive element 21 and the diaphragm 201 is formed with a reverse bias or the P-N junction is turned off (the voltage across the P-N junction is less than the turn-on voltage), and the current may be limited inside the resistor element and the potential of the diaphragm 201 may be controlled. Furthermore, it is possible to achieve the object of improving the drift of the output signal of the piezoresistive sensor 3 according to the structure layout and arrangement.

The operation method according to the second embodiment of the invention, which is applied to the semiconductor piezoresistive sensor 3 of FIGS. 3A and 3B, includes the steps of applying a voltage V2 to the shield layer 26 and applying a voltage V0 to the circuit 30. When a value obtained by subtracting the voltage V1 from the voltage V0 is less than a turn-on voltage between the piezoresistive element 21 and the diaphragm 201, a junction between the piezoresistive element 21 and the diaphragm 201 is formed with a reverse bias or the P-N junction is turned off. Meanwhile, the voltage V2 applied to the shield layer 26 is utilized to stabilize the surface potential on the piezoresistive element 21. Thus, the current is limited inside the piezoresistive element 21, and the object of improving the drift of the output signal of the piezoresistive sensor 3 can be achieved. The voltage V0 or voltage V2 may be the voltage of the bridge circuit or the temperature compensation circuit connected to the semiconductor piezoresistive sensor 2, or the voltage greater than that of the bridge circuit or the temperature compensation circuit.

THIRD EMBODIMENT

Figure 4A:
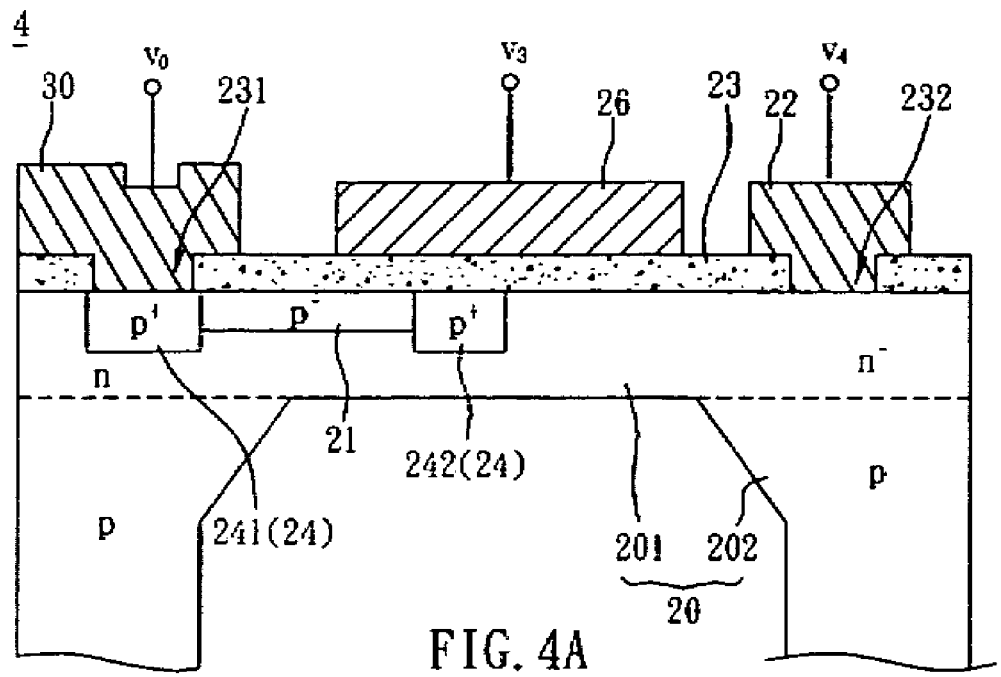
FIGS. 4A and 4B are schematic cross-sectional views showing a semiconductor piezoresistive sensor according to a third embodiment of the invention.
Figure 4B:
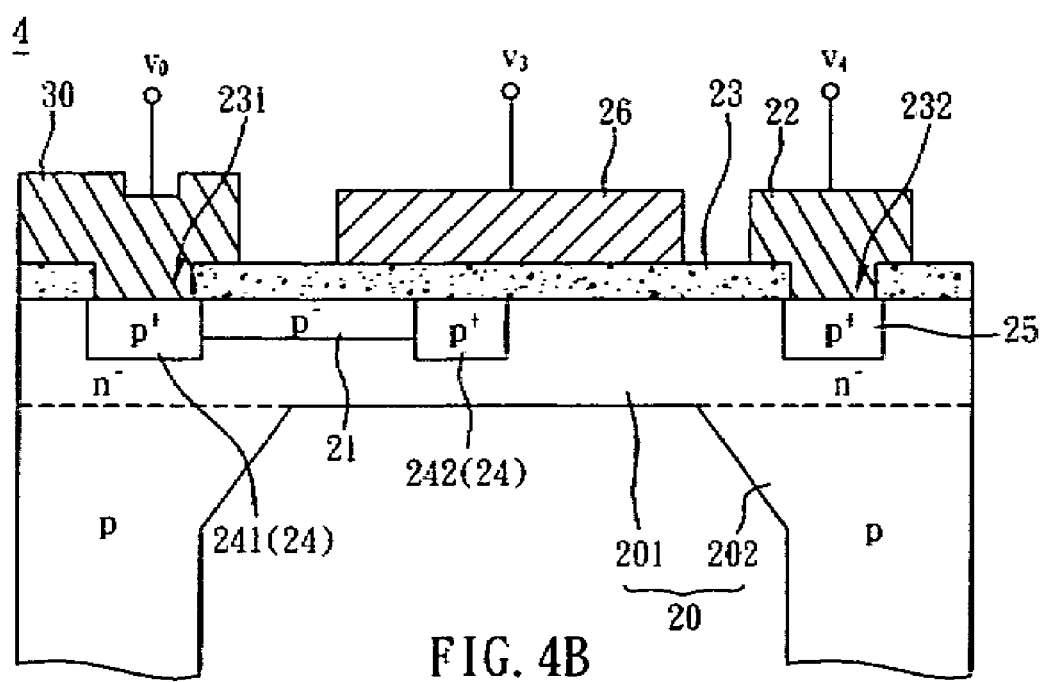

Referring to FIGS. 4A and 4B, a semiconductor piezoresistive sensor 4 according to the third embodiment of the invention includes a semiconductor base 20, an insulating layer 23, at least one piezoresistive element 21, at least one interconnect element 24, a conductive layer 22 and a shield layer 26. The semiconductor piezoresistive sensor 4 is electrically connected with a circuit 30, which may be a bridge circuit or a temperature compensation circuit, for example. As shown in FIG. 4B, the semiconductor piezoresistive sensor 4 further includes a p-doped region 25 disposed between the conductive layer 22 and the diaphragm 201. In this embodiment, the p-doped region 25 is formed in the diaphragm 201 relative to the conductive layer 22, and forms the ohmic contact or Schottky contact with the conductive layer 22 through the opening 232 of the insulating layer 23. The p-doped region 25 has a high doping concentration and is called as the $p^+$-doped region. In this embodiment, the structures, features, materials, layouts, connections, and functions of the semiconductor base 20, the piezoresistive element 21, the interconnect element 24, the insulating layer 23 and the circuit 30 are the same as those of the first embodiment, and the detailed descriptions thereof will be omitted for concise purpose.

The difference between the third embodiment and the first and second embodiments is that the semiconductor piezoresistive sensor 4 of the third embodiment has both the conductive layer 22 and the shield layer 26. The conductive layer 22 is disposed on the insulating layer 23. The conductive layer 22 directly contacts and is thus electrically connected with the diaphragm 201 through another opening 232 of the insulating layer 23. The diaphragm 201 has the same doping concentration (N-) as the base. The conductive layer 22 may contact the diaphragm 201 in the manner of an ohmic contact or a Schottky contact, as shown in FIG. 4A. In addition, the semiconductor piezoresistive sensor 4 of this embodiment further includes a shield layer 26, which is disposed on the insulating layer 23 and covers at least a part of the insulating layer 23. The shield layer 26 is made of a non-insulating material having a TCE (Thermal Coefficient of Expansion), which preferably ranges from −15 ppm/° C. to +15 ppm/° C. Accordingly, the semiconductor piezoresistive sensor 4 can be prevented from having a larger offset and a larger thermal specification (e.g., TCO) due to the TCE difference between the shield layer 26 and the semiconductor base 20. In addition, the phenomenon of the mechanical hysteresis can also be prevented from happening. Herein, as shown in FIG. 5, the shield layer 26 is not electrically connected with the conductive layer 22. However, the shield layer 26 may also be electrically connected with the conductive layer 22 according to the circuit design.

Alternatively, as shown in FIG. 4B, the region for contacting the between the conductive layer 22 is the high-doping concentration region ($p^+$) 25. The p-doped region 25 between the conductive layer 22 and the diaphragm 201 is formed in the diaphragm 201 relative to the conductive layer 22 and forms the ohmic contact or Schottky contact with the conductive layer 22 through the opening 232 of the insulating layer 23. The p-doped region 25 uses the p-type dopant with the high doping concentration, and is thus called as the $p^+$-doped region. It is to be noted that the $p^+$-doped region 25 does not have to be formed by using additional processes, but can be formed with the processes of forming the interconnect element 24.

In either the semiconductor piezoresistive sensor 4 of FIG. 4A or that of FIG. 4B, a voltage V4+ may be properly applied to control the potential of the diaphragm (N-) 201 such that the potential of the diaphragm (N-) 201 does not drift. In addition, the surface potential on the piezoresistive element 21 is stabilized and the surface potential does not drift because of the shield layer 26, which properly shields the piezoresistive element 21 below the insulating layer 23, and the application of the voltage V3+. Each of the voltages V3+ and V4+ may be the bridge circuit voltage (e.g., VB+) of the piezoresistive element 21 or the voltage (e.g., the Vs+ coming from the temperature compensation circuit) greater than other bridge circuit voltages of the sensor. Thus, the junction between the piezoresistive element 21 and the diaphragm 201 is formed with a reverse bias or the P-N junction is turned off (the voltage across the P-N junction is less than the turn-on voltage), and the current may be limited inside the resistor element and the potential of the diaphragm 201 may be controlled. Furthermore, it is possible to achieve the object of improving the drift of the output signal of the piezoresistive sensor 4 according to the structure layout and arrangement.

The operation method according to the third embodiment of the invention, which is applied to the semiconductor piezoresistive sensor 4 of FIGS. 4A and 4B, includes the steps of applying a voltage V4 to the conductive layer 22, applying a voltage V0 to the circuit 30, and applying a voltage V3 to the shield layer 26. When a value obtained by subtracting the voltage V4 from the voltage V0 is less than a turn-on voltage between the piezoresistive element 21 and the diaphragm 201, a junction between the piezoresistive element 21 and the diaphragm 201 is formed with a reverse bias or the P-N junction is turned off. Thus, the current is limited inside the piezoresistive element 21, and the object of improving the drift of the output signal of the piezoresistive sensor 4 can be achieved. The voltage V0, V3 or V4 may be the voltage of the bridge circuit or the temperature compensation circuit connected to the semiconductor piezoresistive sensor 2, or the voltage greater than that of the bridge circuit or the temperature compensation circuit.

FOURTH EMBODIMENT

Figure 5A:
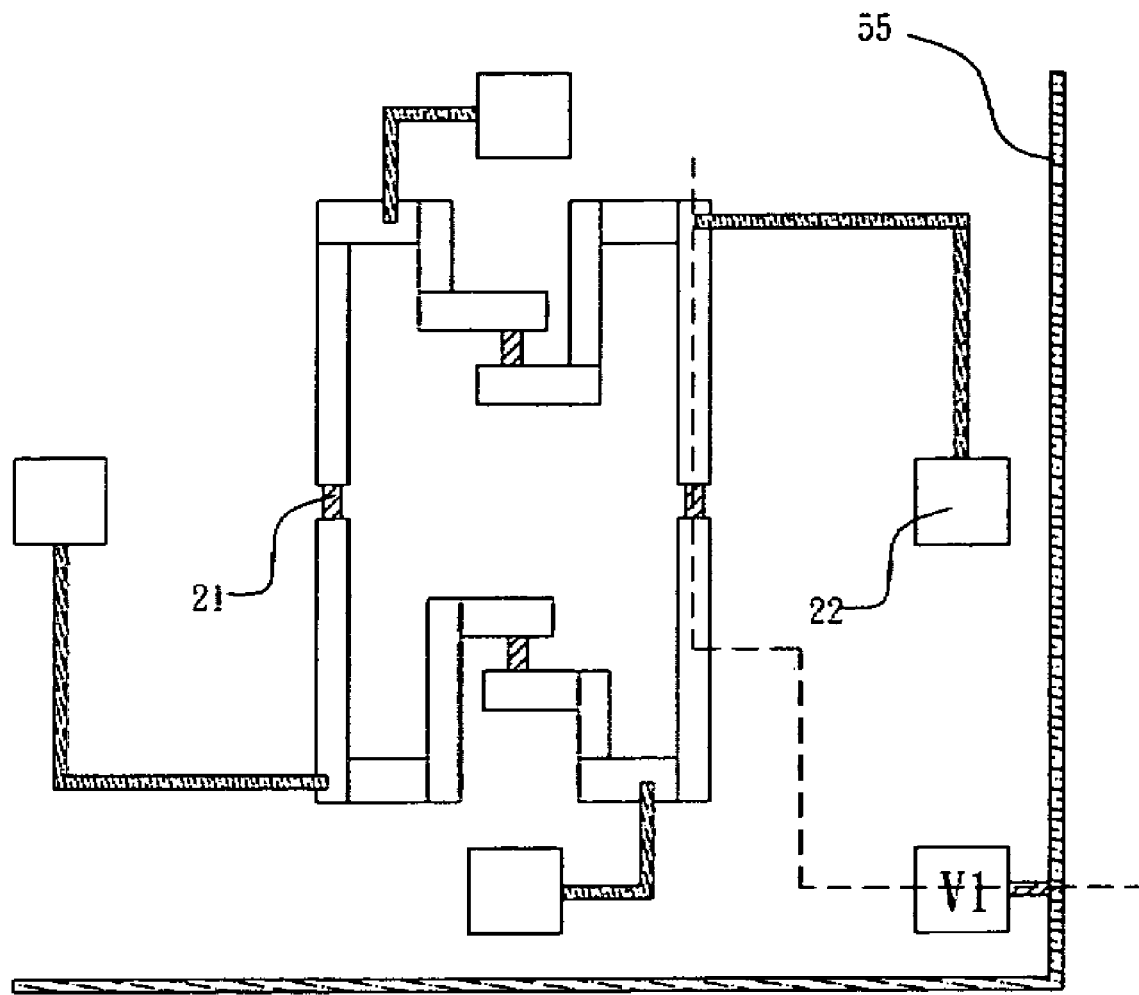
FIG. 5A is a schematic view showing a semiconductor piezoresistive sensor according to a fourth embodiment of the invention.
Figure 5B:
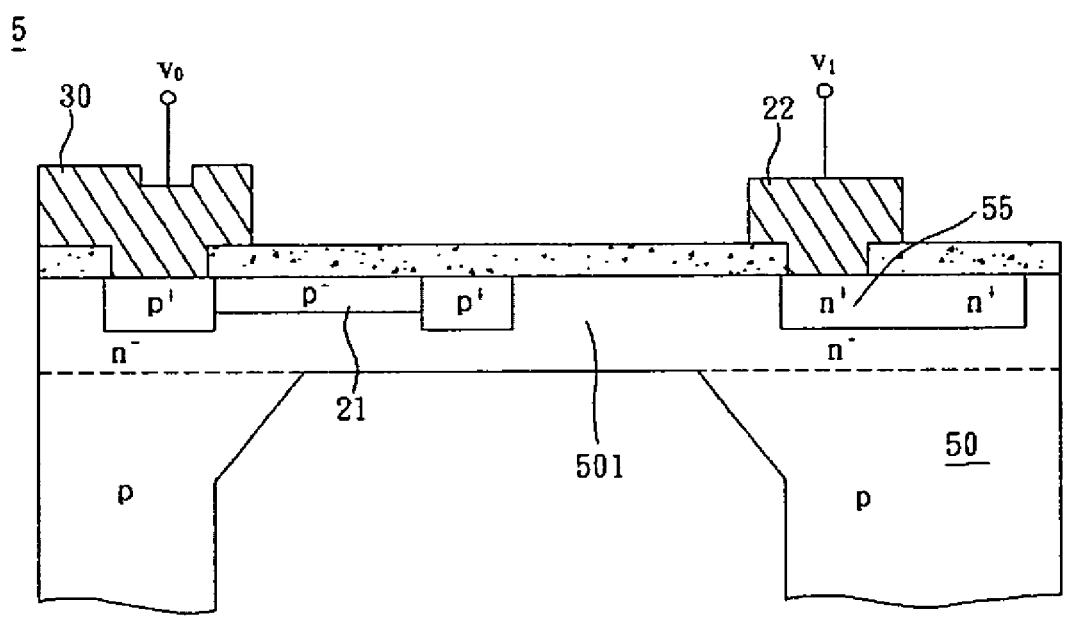
FIG. 5B is a schematic cross-sectional view showing the semiconductor piezoresistive sensor of FIG. 5A.

Referring to FIGS. 5A and 5B, FIG. 5A is a schematic view showing a semiconductor piezoresistive sensor according to a fourth embodiment of the invention, and FIG. 5B is a schematic cross-sectional view showing the semiconductor piezoresistive sensor of FIG. 5A. A semiconductor piezoresistive sensor 5 is electrically connected with a circuit 30 and includes a semiconductor base 50, at least one p-doped piezoresistive element 21, and a conductive layer 22. The semiconductor base 20 has an n-doped base 501, and the at least one p-doped piezoresistive element 21 is formed in the n-doped base 501. The conductive layer 22 is electrically connected with the n-doped base 501 so as to form a regional high doping concentration area 55 to surround the at least one p-doped piezoresistive element 21. In this embodiment, the regional high doping concentration area 55 surrounds all p-doped piezoresistive elements 21, but the present invention is not limited thereto. There can be several regional high doping concentration areas 55, and each of the regional high doping concentration areas 55 surrounds only one p-doped piezoresistive element 21. The conductive layer 22 is made of a non-insulating material, and the regional high doping concentration region 55 forms a guard ring and is electrically connected to the conductive layer 22. The regional high doping concentration region 55 can be formed by using N-plus or P-plus dopants. The first voltage V1 is applied to the conductive layer 22, and the first voltage V1 is equal to or greater than a maximum value of a bridge circuit voltage of the circuit 30. Also, It is noted that the structures, features, materials, layouts, connections, and functions of the circuit 30, the piezoresistive element 21, the conductive layer 22, and so on are the same as those of the first embodiment, and the detailed descriptions thereof will be omitted for concise purpose.

In summary, the conductive layer or the shield layer is electrically connected with the diaphragm of the semiconductor base in the semiconductor piezoresistive sensor and the operation method thereof according to the invention. The conductive layer and the shield layer respectively include the conductive material and the non-insulating material. When the semiconductor piezoresistive sensor of the invention is applied to a circuit, and a proper voltage is inputted into the conductive layer or shield layer such that the difference between the voltages applied to the circuit is lower than the turn-on voltage between the piezoresistive element and the diaphragm. Consequently, the junction between the piezoresistive element and the diaphragm is turned off and the current is limited within the piezoresistive element, such that the phenomenon of the drift of the output signal of the piezoresistive element is improved. Compared to the prior art, it is unnecessary to form a semiconductor doping region, which is different from the piezoresistive element, on the semiconductor base in this invention. Thus, the manufacturing steps are effectively simplified, the manufacturing cost is reduced, and the precision of measurement of the semiconductor piezoresistive sensor is enhanced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A semiconductor piezoresistive sensor, electrically connected with a circuit, the semiconductor piezoresistive sensor comprising:
   a semiconductor base, comprising a diaphragm and a base disposed adjacent to and around the diaphragm;
   at least one piezoresistive element being formed in the diaphragm and being electrically connected with the circuit;
   an insulating layer disposed on the semiconductor base and covering the piezoresistive element; and
   a non-insulating layer electrically connected with the diaphragm, wherein the non-insulating layer is a conductive layer or a shield layer disposed on the insulating layer and covering at least a part of the insulating layer;
   wherein the shield layer has a TCE (Thermal Coefficient of Expansion) ranging from −15ppm/° C. to +15ppm/° C.

2. The semiconductor piezoresistive sensor according to claim 1, further comprising a p-doped region formed in the diaphragm and being contact with the non-insulating layer.

3. The semiconductor piezoresistive sensor according to claim 2, wherein the non-insulating layer and the p-doped region form an ohmic contact or a Schottky contact.

4. The semiconductor piezoresistive sensor according to claim 1, wherein the non-insulating layer and the diaphragm form an ohmic contact or a Schottky contact.

5. The semiconductor piezoresistive sensor according to claim 1, wherein the insulating layer comprises silicon oxide, silicon nitride, silicon oxynitride, or their combinations.

6. The semiconductor piezoresistive sensor according to claim 1, wherein when the non-insulating layer is the conductive layer, the semiconductor piezoresistive sensor further comprises an another shield layer disposed on the insulating layer and covering at least a part of the insulating layer isolated from or electrically connected with the conductive layer.

7. The semiconductor piezoresistive sensor according to claim 1, further comprising at least one interconnect element, which is electrically connected with the circuit and the piezoresistive element.

8. The semiconductor piezoresistive sensor according to claim 1, wherein the diaphragm is an n-doped region, and the piezoresistive element is a p-doped region.

9. The semiconductor piezoresistive sensor according to claim 1, wherein the piezoresistive element is electrically connected with the circuit.

10. The semiconductor piezoresistive sensor according to claim 9, wherein the circuit is a bridge circuit or a temperature compensation circuit.

11. An operation method for the semiconductor piezoresistive sensor, which comprises a semiconductor base comprising a diaphragm and a base disposed adjacent to and around the diaphragm, at least one piezoresistive element being formed in the diaphragm and being electrically connected with the circuit, and a non-insulating layer electrically connected with the diaphragm, the method comprising steps of:
   applying a first voltage to the circuit; and
   applying a second voltage to the non-insulating layer,
   wherein when a value obtained by subtracting the second voltage from the first voltage is less than a turn-on voltage between the piezoresistive element and the diaphragm, a junction between the piezoresistive element and the diaphragm is formed with a reverse bias or the junction is turned off.

12. The operation method for the semiconductor piezoresistive sensor according to claim 11, wherein the semiconductor piezoresistive sensor further comprises an insulating layer and a shield layer, the insulating layer is disposed on the semiconductor base and covers the piezoresistive element, the shield layer is disposed on the insulating layer and covers at least a part of the insulating layer, the method further comprising a step of:
   applying a third voltage to the shield layer for stabilizing a surface potential above the piezoresistive element.

13. A semiconductor piezoresistive sensor, electrically connected with a circuit, the semiconductor piezoresistive sensor comprising:
   a semiconductor base comprising an n-doped base;
   at least one p-doped piezoresistive element being formed in the n-doped base; and
   a conductive layer electrically connected with a regional high doping concentration region in the n-doped base, wherein the regional high doping concentration region surrounds the at least one p-doped piezoresistive element as a guard ring.

14. The semiconductor piezoresistive sensor according to claim 13, wherein conductive layer is made of a non-insulating material.

15. The semiconductor piezoresistive sensor according to claim 13, wherein the regional high doping concentration region comprises N-plus or a P-plus dopant.

16. The semiconductor piezoresistive sensor according to claim 13, wherein a first voltage is applied to the conductive layer, and the first voltage is equal to or greater than a maximum value of a bridge circuit voltage.

17. The operation method for the semiconductor piezoresistive sensor according to claim 11, wherein the semiconductor piezoresistive sensor further comprises an insulating layer disposed on the semiconductor base and covering the piezoresistive element, and the non-insulating layer is a conductive layer or a shield layer disposed on the insulating layer and covering at least a part of the insulating layer.

* * * * *